3,721,650
REACTIVE HYDROXYALKYL-ONIUM CATALYSTS
FOR SYNTHESIS OF POLYOXAZOLIDONES
Gaetano F. D'Alelio, 2011 E. Cedar St.,
South Bend, Ind. 46617
No Drawing. Filed Mar. 22, 1971, Ser. No. 126,946
Int. Cl. C08g 30/04
U.S. Cl. 260—47 EP          19 Claims

ABSTRACT OF THE DISCLOSURE

A process for preparing polyoxazolidones is provided in which a polyepoxide is reacted with a polyisocyanate in the presence of chemically reactive hydroxyalkyl-onium catalysts, selected from the class of ammonium and phosphonium halides having at least two hydroxyalkyl groups. Novel polymers are obtained when these new catalysts containing two or more hydroxy groups are condensed with polyisocyanates.

BACKGROUND OF THE INVENTION

A  The background of the invention is in the field of synthetic polymers prepared by reacting a polyepoxide with a polyisocyanate in the presence of specific chemically coreactive catalysts. These polymers can be used as adhesives, coatings, in laminating compositions, as molding compounds, caulking pastes, potting and encapsulating substances and the like.

FIELD OF THE INVENTION

This invention relates to a process for preparing polyoxazolidones. In one aspect it relates to novel catalysts for use in the polycondensation of a polyepoxide and a polyisocyanate. In another aspect it relates to new polyoxazolidones in which the catalyst becomes an integral part of the polymer by reaction with the polyepoxide and polyisocyanate reactants.

DESCRIPTION OF THE PRIOR ART

The synthesis of polyoxazolidones by the condensation of polyepoxides with polyisocyanates is described in the prior patent literature. For example, U.S. Pat. No. 3,020,262 discloses such a reaction in which quaternary ammonium halides are used as catalysts. However, the process is not entirely satisfactory since the polymerization rate is slow as a result of the limited solubility of the catalyst, and of homo-polymerization of the polyisocyanates and polyepoxides as side reactions. U.S. Pat. No. 3,334,110 describes a method in which the rate is increased by use of an aliphatic alcohol as a co-catalyst with a quaternary ammonium halide; this process required the substantial elimination of alcohol to achieve practical properties in the polymer. Organic phosphonium halides as catalysts are disclosed in my copending application, Ser. No. 126,947, filed Mar. 22, 1971, which catalysts, however, do not contain hydroxyalkyl groups to coreact with the polyisocyanate or polyepoxide reactants in reaction mixture, but which do contain coreactive oxirane groups.

SUMMARY OF THE INVENTION

This invention relates to a new method for the preparation of oxazolidone compounds, especially polymers. In general, it concerns the use of noval onium halide catalysts for the condensation polymerization of polyisocyanates with polyepoxy compounds. In particular, it refers to the use of novel catalysts which coreact in the polymerization and become an integral part of the polymer structure. More specifically, it deals with reactive onium halides, selected from the class of ammonium and phosphonium halides, containing at least two hydroxyalkyl groups and can be described as polyhydroxyalkyl onium halides.

Some typical compounds of this new class of catalysts are:

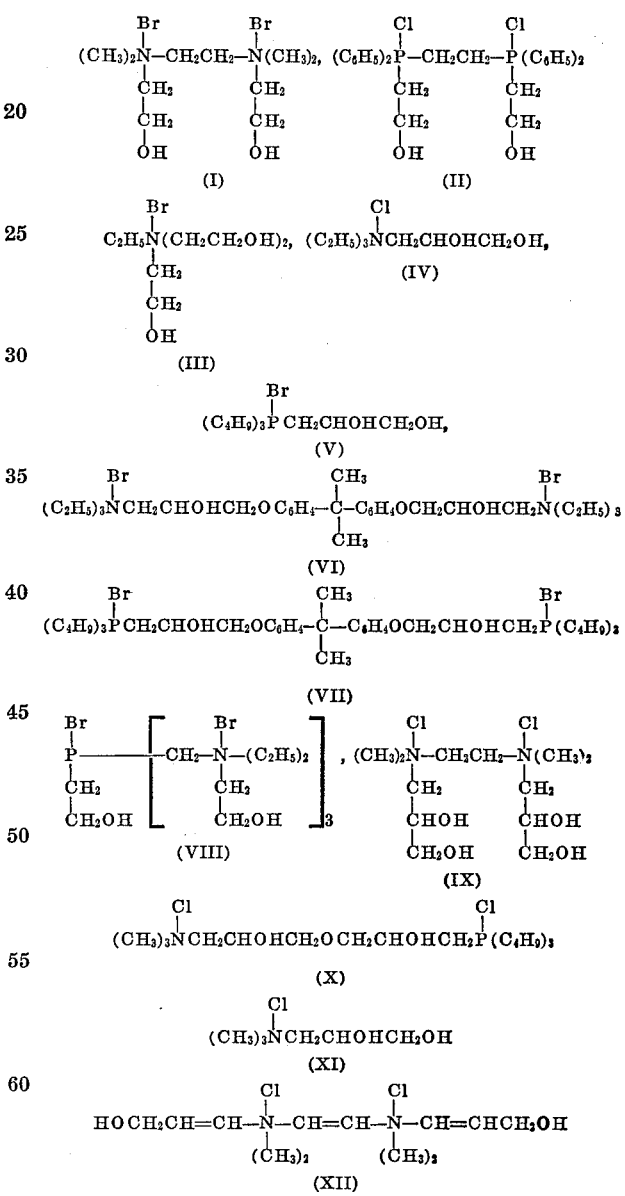

These typical examples show that these catalysts may contain one or more ammonium or phosphonium moieties, or both the ammonium and phosphonium moieties in the same molecule. These catalysts are readily synthesized by well-known procedures which involve quaternizing a tertiary amine or phosphine with the appropriate halide, according to the generalized Equation 1 for the mono-onium derivatives and Equation 2 for the polyonium derivatives.

$$R_3Q + RX \longrightarrow R_4X \qquad (Eq.\ 1)$$

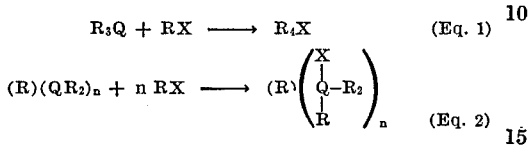

(Eq. 2)

wherein
R represents appropriate hydrocarbon or substituted hydrocarbon groups more fully described hereinafter,
X represents a halogen such as Br, Cl, I and F,
$n$ has a numerical value corresponding to the valency of (R) and is at least two or more, and may be as high as ten, and
Q represents the nitrogen and phosphorous atoms.

The synthesis of these new catalysts is illustrated by the following reactions for catalysts I to X given hereinabove.

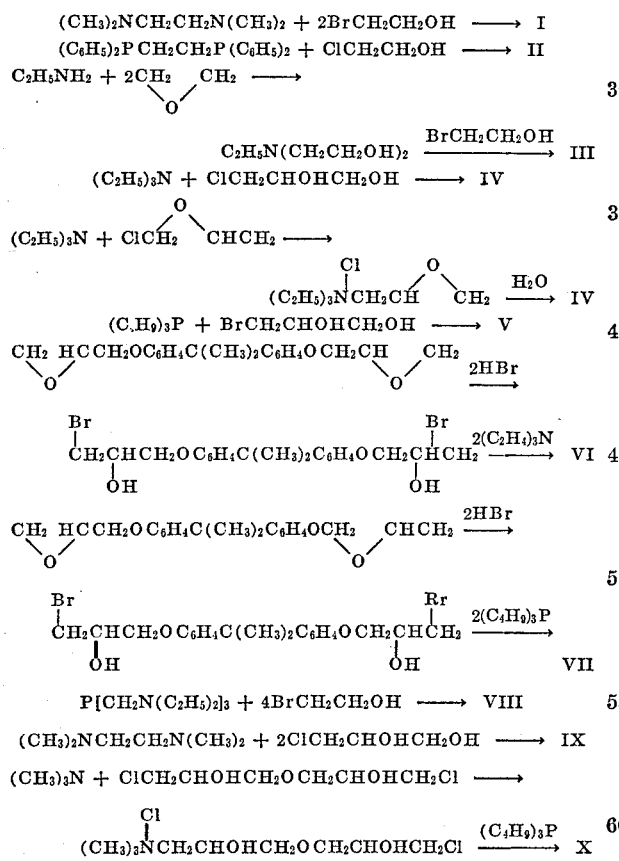

Additional examples of polyhydroxyl onium catalysts useful in the practice of this invention, and which are readily prepared by quaternization procedures are:

$$BrN(CH_2CH_2OH)_4,\ ClN(CH_2CH_2OH)_4,\ IN(CH_2CH_2OH)_4$$

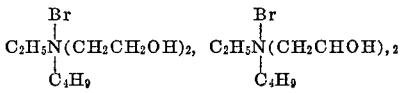

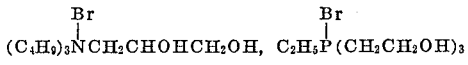

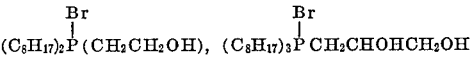

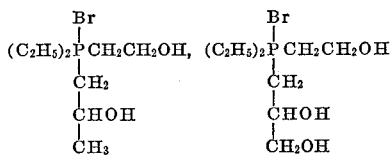

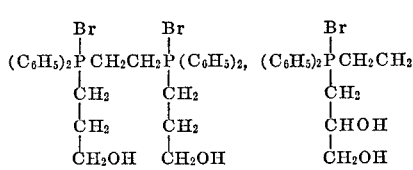

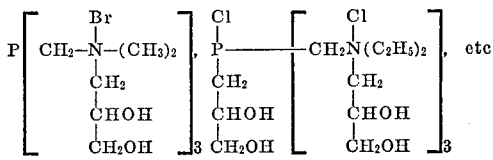

These polyhydroxy catalysts are also conveniently prepared by hydrolysis of the corresponding epoxy precursors disclosed in my copending application, Ser. No. 126,947, filed Mar. 22, 1971 to which reference is hereby made.

For reasons of economy and availability of reactants, the bromides and chlorides are preferred. The selection of a specific compound, with reference to the number of hydroxy alkyl groups, depends on the nature of the polymer desired. When linear polymers are desired the dihydroxy derivatives are preferred, but if a crosslinked polymer is required or desired, then those compounds containing three or more hydroxy groups up to about nine, are preferred.

The hydroxy groups of these polyhydroxyalkyl onium halide catalysts undergo the reactions of aliphatic alcohol and accordingly, react with either the isocyanate moieties of the polyisocyanate or with the epoxide moieties of the polyepoxides present as polymerization reactants in the system. This reactivity is readily established by prototype reactions with monoisocyanates or monoepoxide, thus, as for example,

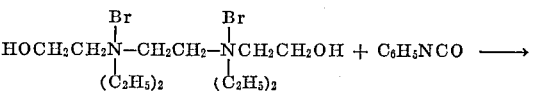

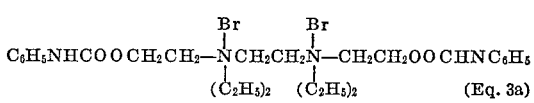

(Eq. 3a)

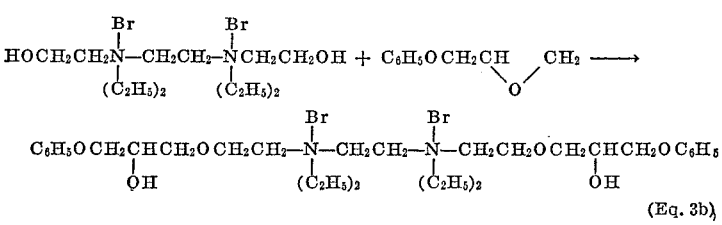

(Eq. 3b)

When a polyepoxide or a polyisocyanate is used polymer formation occurs incorporating the onium halide into the molecular structure of the polymer, such as is illustrated when toluene isocyanate is reacted with a dihydroxy onium halide,

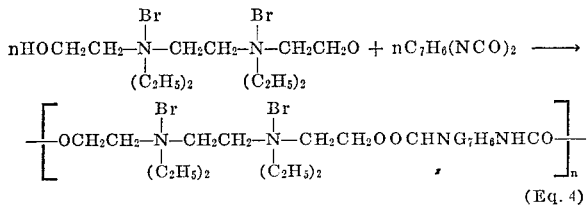

(Eq. 4)

A similar polyurethane formation occurs when the polyhydroxyalkyl phosphonium halides are used instead of the ammonium compound in Equation 4. Polymeric polyethers are formed, in a related manner, when the dihydroxy onium halides are reacted with diepoxy compounds instead of the monoepoxy compounds of Equation 3, thus

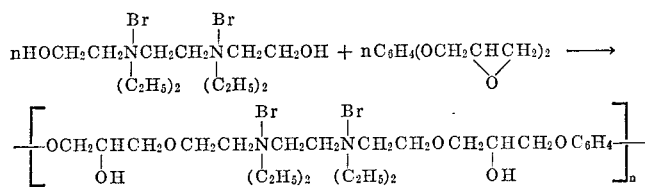

The formation of the urethane linkage in the reaction given by Equation 4 is readily confirmed by infrared spectral analysis. The characteristic absorption band for isocyanate appears in the infrared in the 2250–2300 cm.$^{-1}$ region, and when the isocyanate reacts with the onium halide polyol, this band disappears with the appearance of absorption in the region of 1690–1740 cm.$^{-1}$, characteristic of the urethane structure.

The polyhydroxyalkyl onium halides used in the practice of this invention are quaternary halides of nitrogen and phosphorous, having at least two and no more than about nine hydroxyalkyl groups, which are reactive with the —NCO moiety of the isocyanates. These polyhydroxyalkyl onium halide catalysts have the formula selected from the class of

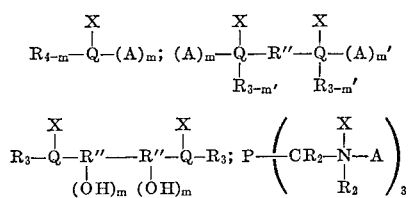

and

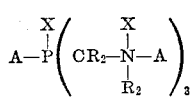

wherein

X is a halogen selected from the class of Cl, Br, F and I,
Q is selected from the class of N and P,
R represents a monovalent aliphatic or aromatic hydrocarbon radical containing one to ten carbon atoms,
A represents —R′—(OH)$_n$ in which R′ represents an aliphatic hydrocarbon radical containing one to six carbon atoms,
$n$ has a numerical value of at least one and no more than three,
$m$ has a numerical value of one to four,
$m″$ has a numerical value of one to three, and
R″ represents a divalent aliphatic or aromatic hydrocarbon radical having one to twenty carbon atoms.

In the above formula, the monovalent hydrocarbon radical, R, can be a saturated alkyl or an unsaturated alkenyl or alkynyl, a saturated or unsaturated cycloaliphatic, an aromatic hydrocarbon of the benzeneoid series, and the like, aralkyl, alkaryl, substituted alkyl, alkenyl, alkynyl such as the halogenated substituted compounds, alkyloxy, cyanoalkyls, and the like, some examples of which are methyl, ethyl, vinyl, propyl, allyl, isopropenyl, propargyl, cyclohexyl, cyanoethyl, butoxyethyl, ethoxyethyl, benzyl, phenyl, tolyl, phenethyl, p-t-butyl phenyl.

2,4—(CH$_3$)$_2$C$_6$H$_3$—, 2,5—(CH$_3$)$_2$C$_6$H$_3$—
2,3,5—(CH$_3$)$_3$C$_6$H$_2$—, 2,4,6—(CH$_3$)$_3$C$_6$H$_2$—
4—C$_3$H$_7$C$_6$H$_4$—, 2,4—(C$_2$H$_5$)$_2$C$_6$H$_3$—, C$_6$H$_5$OC$_6$H$_4$—
C$_6$H$_5$SO$_2$C$_6$H$_4$—, C$_6$H$_5$COC$_6$H$_4$—, ClC$_6$H$_4$—,
Cl$_2$C$_6$H$_3$—, CHCl=CClCH$_2$—, etc.

The divalent hydrocarbon, R″, can be selected from aliphatic and aromatic structures such as alkylene, substituted alkylenes, alkyleneoxy, alkenylene, substituted alkenylene, arylene, substituted arylene and the like.

Typical examples of R″ are —CH$_2$—, —CH$_2$CH$_2$—,
—CH$_2$CH$_2$CH$_2$—, —CH$_2$CH$_2$CH$_2$CH$_2$—
—H$_2$CCH=CHCH$_2$—, —H$_2$CC≡CCH$_2$—
—H$_2$CC$_6$H$_4$CH$_2$—, —C$_6$H$_4$—
—H$_2$CCH$_2$C$_6$H$_4$CH$_2$CH$_2$—, —H$_2$CCH$_2$SCH$_2$CH$_2$—, etc.

While some of the R and R″ radicals contain O, SO$_2$, CO, and Cl they are not entirely hydrocarbon; they are attached to Q through a carbon bond and are predominantly hydrocarbon and for the purpose of this invention are regarded as such. Additional examples of R″ are given hereinafter by Z, symbol used in the description of the polyepoxides and the polyisocyanates.

By the term polyepoxide is meant a compound having at least two epoxy, or oxirane, groups of the structure

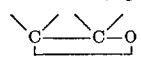

the oxirane structure is characterized by having an oxygen atom attached to two adjacent carbon atoms. The polyepoxide may possess more than two oxirane groups and the number may be as high as ten, or twenty, or even a hundred or more, as in the case of the polyglycidyl acrylates and methacrylates,

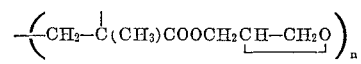

preferred by the procedure given in the Journal of Macromolecular Science-Chemistry, A3(5), 1207 (1969). The polyepoxide reactants suitable for use in the preparation of polyoxazolidones are essentially unlimited. The particular polyepoxide selected for use will depend on such factors as the properties desired in the polymer, cost, reactivity, commercial availability and on practical as well as theoretcial considerations. The polyepoxides can be saturated, unsaturated, aliphatic, cycloaliphatic, aromatic and heterocyclic, and can be written as

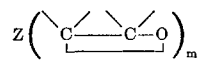

wherein $m$ is a numerical value of at least two and Z is a polyvalent organic radical selected from aliphatic and aromatic structures such as alkylene, substituted alkylenes, alkyleneoxy, alkenylene, substituted alkenylene, arylene, substituted arylene, aliphatic amide, aromatic amides and imides and the like, as shown hereinafter for $Z(NCO)_m$. Useful polyepoxides include glycidyl ethers derived from epichlorohydrin adducts of polyols and polyhydric phenols. A particularly suitable epoxide is the diglycidyl ether of bisphenol A of the formula

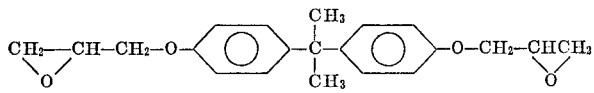

Additional examples of other polyepoxides are:

resorcinol diglycidyl ether;
3,4-epoxy-6-methylcyclohexylmethyl-9,10-epoxystearate;
1,2-bis(2,3-epoxy-2-methylpropoxy)ethane,
the digylcidyl ether of 2,2-(p-hydroxyphenyl) propane;
butadiene dioxide;
dicyclopentadiene dioxide;
pentaerythritol tetrakis(3,4-epoxycyclohexanecarboxylate);
vinylcyclohexane dioxide;
divinylbenzene dioxide;
1,5-pentadiol bis(3,4-epoxycyclohexanecarboxylate;
ethylene glycol bis(3,4-epoxycyclohexanecarboxylate);
2,2-diethyl-1,3-propanediol bis(3,4-epoxyclcohexanecarboxylate);
1,6-hexanediol bis(3,4-epoxycyclohexanecarboxylate);
2-butene-1,4-diol bis(3,4-epoxy-6-methylcyclohexanecarboxylate);
1,1,1-trimethylolpropane tris(3,4-epoxycyclohexanecarboxylate);
1,2,3-propanetriol tris(3,4-epoxycyclohexanecarboxylate);
dipropylene glycol bis(2-ethylhexyl-4,5-epoxycyclohexane-1,2-dicarboxylate);
diethylene glycol bis(3,4-epoxy-6-methylcyclohexanecarboxylate);
triethylene glycol bis(3,4-epoxycyclohexanecarboxylate);
3,4-epoxycyclohexylmethyl 3,4-epoxycyclohexanecarboxylate;
3,4-1-methylcyclohexylmethyl 3,4-epoxy-1-methylcyclohexanecarboxylate;
bis(3,4-epoxycyclohexylmethyl) pimelate;
bis(3,4-epoxy-6-methylcyclohexylmethyl) maleate;
bis(3,4-epoxy-6-methylcyclohexylmethyl) succinate;
bis(3,4-epoxycyclohexylmethyl) oxalate;
bis(3,4-epoxy-6-methylcyclohexylmethyl) sebacate;
bis(3,4-epoxy-6-methylcyclohexylmethyl) adipate;
bis(3,4-epoxycyclohexylmethyl) terephthalate;
bis(3,4-epoxy-6-methylcyclohexylmethyl) terephthalate;
2,2'-sulfonyldiethanol bis(3,4-epoxycyclohexanecarboxylate);
N,N'-ethylene bis(4,5-epoxycyclohexane-1,2-dicarboximide);
di(3,4-epoxycyclohexylmethyl) 1,3-tolylenedicarbamate;
3,4-epoxy-6-methylcyclohexanecarboxaldehyde acetal;
3,9-bis(3,4-epoxycyclohexyl)spirobi-(metadioxane), etc.

Another class of suitable polyepoxide reactants is the polyglycidyl ether terminated organic polyhydric alcohols having molecular weights of from about 100 to 4,000, and particularly from about 150 to 1,000. The polyhydric alcohols, for example, having two or three hydroxy groups, are preferably: poly(oxyalkylene) glycols; alkylene oxide adducts of aliphatic polyols; and polyhydroxy phenolic compounds. The alkylene groups of the poly(oxyalkylene) glycols and alkylene oxides can have from two to four carbon atoms and particularly from two to three carbon atoms. The poly(glycidyl ether) terminated polyhydric alcohols (polyols) can be represented by the formula:

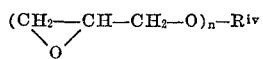

wherein $n$ is an integer such as two or three, and $R^{iv}$ represents the polyol residue after removal of terminal hydroxy groups. The diglycidyl ether of bisphenol A is a satisfactory example of such polyepoxides, as shown in the formula given hereinabove. Illustrative of other polyglycidyl ethers of polyols of the above formula there can be mentioned those perpared by the reaction of: about two moles of epichlorohydrin with one mole of a polyethylene glycol or polypropylene glycol having a molecular weight of 200, 400, or 800, or with one mole of tetramethyleneglycol, tetrapropylene glycol and the like, respectively, or about three moles of epichlorohydrin with trimethylol propane or its adducts with ethylene- or propylene oxide, etc.

Additional examples of polyepoxide compounds are given in U.S. Pats. Nos. 3,334,110; 3,341,337; 3,415,901 and 3,440,230 to which reference is hereby made.

By the term polyisocyanate is meant a compound having at least two —NCO groups. The polyisocyanates used in the preparation of the polyoxazolidones are represented by the formula, $Z(NCO)_m$, wherein Z and $m$ have the same meaning as above. Z can include radicals such as —R″—Q′—R″— where Q′ can be a divalent moiety such as —O—, —O—R″—O—, —CO—, —CO$_2$—, —NH—, —CONH—, —S—, —S—R″—S—, —SO$_2$—, and the like. Some typical examples of such compounds include: hexamethylene diisocyanate, xylylene diisocyanates, $(OCNCH_2CH_2CH_2OCH_2)_2$, 1-methyl-2,4 - diisocyanatecyclohexane, phenylene, diisocyanates, tolylene diisocyanates, chlorophenylene disocyanates, polyhalophenylene diisocyanates, diphenylmethane-4,4'-diisocyanate, naphthalene - 1,5 - diisocyanate, triphenylmethane-4,4',4"-triisocyanate, xylene-α,α' - diisothiocyanate, isopropylbenzene-α 4-diisocyanate, etc.

Among the useful polyisocyanate reactants are included dimers and trimers of isocyanates and diisocyanates and polycyanates of the general formula $(ZNCO)_x$ and $[Z(NCO)_x]_y$ in which $x$ and $y$ are two or more, as well as compounds of the general formula $(M(NCO)_x$ in which $x$ is two or more and M represents any polyfunctional atom or group, which include such compounds as ethylphosphonic diisocyanate, $C_2H_5P(O)(NCO)_2$; phenylphosphonic diisocyanate, $C_6H_5P(NCO)_2$; compounds containing a ≡Si—NCO group, isocyanates derived from sulfonamides, $Z(CO_2NCO)_x$; and the polyisocyanates which are obtained by phosgenation of the reaction products of aniline and formaldehyde as given by the following general formula:

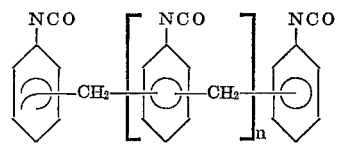

wherein $n$ equals zero to ten.

Further included among the polyisocyanates are the isocyanate prepolymers, many of which are commercially available for current use in the preparation of polyurethane products. These prepolymers are prepared, as is well known, by end-capping polyols reactions with diisocyanates, one mole of diisocyanate per each mole of hydroxyl group in the presence of a catalyst, usually an organic stannate derivative. Additional examples of polyisocyanates are given in U.S. Pats. 3,334,110; 3,415,901; 3,440,230 and 3,458,527 to which reference is hereby made.

In the absence of catalysts the reaction of an epoxide with an isocyanate does not occur at room temperature and only very slowly, if at all, at 100° C. In this invention, the amount of catalyst used depends on the nature or the natures of both the polyepoxide and of the polyisocyanates to be reacted, the temperature of the reaction and the absence or presence of solvents which tend to decrease the rate of reaction. Thus, when the onium halides of this invention are used as catalysts for an epoxide-isocyanate reaction, the quantity of catalyst used can vary over a wide range, from about 0.005% to 10% or more by weight of the epoxide and isocyanate reactants, the preferred range being about 0.1% to 5% of the combined weight of the polyepoxide and the isocyanate, about 2% being usually an upper satisfactory limit in most cases. However, when an onium halide is used alone to prepare a polymer by reaction with a polyisocyanate, it also acts to catalyze the reaction and in equal molar ratios, it constitutes 50 mole percent of the polymer reactants, and if one-half mole of the onium halide is replaced by one-half mole of a polyepoxide, then the onium halide, as catalyst and reactants, will constitute 25 mole percent of the reactants. Similarly, if the onium halide is reacted directly with a polyepoxide, as catalyst and reactant, it may constitute as much as 50 mole percent of the reactants. The onium halide catalyst may be added directly by the simple expediency of mixing it together with the composition components at room temperature to those cases where the components are liquid or not too viscous at room temperature, or at slightly higher than room temperature to cause a decrease in the mixture to facilitate mixing. The incorporation of the catalyst into the reaction mixture can, in all cases, whether the mixture is liquid or solid, be facilitated by the use of solvent, if desired, by preparing the catalyst as a solution in a suitable solvent, preferably a solvent which does not react with the components in the reaction mixture, such as dioxane, ethyl ether, tetrahydrofuran, acetone, methyl ethyl ketone, glycol dimethyl ether, ethyl acetate and the like.

Most of the polyepoxides are fluid or viscous liquids at room temperature, or become very fluid when heated to higher temperatures of the order of 75–100° C. and in liquid form are good solvents for polyisocyanates, forming homogeneous solutions readily without the need of solvents. In such cases, if the practical advantage of solventless compositions are required in specific applications, or are desired for economic reasons, the catalysts can be added to the homogeneous mixture of reactants, or it can be added to one of the reactants which is then added to the remainder of the reactant system. However, in some cases, where one or more of the reactants are high melting or are highly aromatic with poor solvent properties for the other reactants, solvents are used to achieve homogeneity of the reactants. If it is desired to use a solvent initially as the reaction medium, even in those systems in which the reactants are mutually solvent, to prepare coating compositions and the like, there can be used alone or as mixtures with each other, such common low-cost solvents as the ketones, for example, acetone, methylethyl ketone, isophorone, cyclohexanone, etc.; the esters, such as ethyl acetate, butyl acetate, isopropyl propionate, etc.; the glycol and diethylene glycol ethers, such as the dimethyl ether, the dibutyl ether, etc.; the cyclic ethers, such as dioxane, tetrahydrofuran; the halogenated solvents, such as methylene dichloride, ethylene dichloride, trichloroethylene, chloroform, carbon tetrachloride, and the like. In those cases where more active solvents are required, as in the highly aromatic systems, aprotic polar solvents can be used alone or admixed with the poorer low-cost solvents indicated above or with hydrocarbon solvents such as benzene, toluene, heptane, cyclohexane, and the like.

A particularly useful class of active solvents are the normally liquid N,N-dialkylcarboxylamides of which the lower molecular weight species are preferred, for example, N,N-dimethylformamide and N,N-dimethylacetamide, N,N-diethylformamide, N,N - dimethylmethoxyacetamide, N-methyl-caprolactam, as well as dimethyl sulfoxide, N-methyl-2-pyrrolidone, tetramethylurea, dimethyl sulfone, hexamethylphosphoramide, formamide, N-methylformamide, butyrolactone, succinonitrile, dimethylsulfoxide, tetramethylenesulfoxide, malonitrile, N-acetal-2-pyrrolidone, nitroethane, nitropropane, etc.

Solvents of the type indicated above can also be added during the course of the polymerization reaction. As the reaction proceeds, a substantial increase in viscosity of the system occurs, and solvents can be added to the partially polymerized composition, if desired, to decrease its viscosity for specific application.

The polymerization reactions can be performed over a wide range of temperatures which depend on the nature of the reactants, the concentration of catalyst and the absence or presence of solvents from about room temperature to as high as up to about 200° C. At constant catalyst concentration the rate increases with temperature; at constant temperature the rate increases with catalyst concentration. At high catalyst concentrations, the reactions occur readily at ambient temperature; at low catalyst concentrations, temperatures in the range of 50–150° C. are generally satisfactory and in all cases postheating, at higher temperatures up to about 200° C. can be used to assure completeness of the reaction.

The reaction between an epoxide moiety and an isocyanate moiety produces an oxazolidone ring,

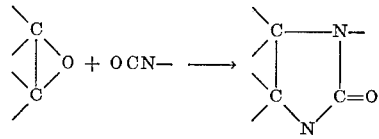

and in the case where polyfunctional reactants are used, propagation yields the class of polymers known as polyoxazolidone as illustrated by the reaction between a diepoxide, symbolized, for this purpose, by

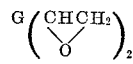

and a diisocyanate symbolized by G'(NCO)$_2$. At equal molar ratios, the resulting polymer is terminated by one —NCO and one epoxide function, thus:

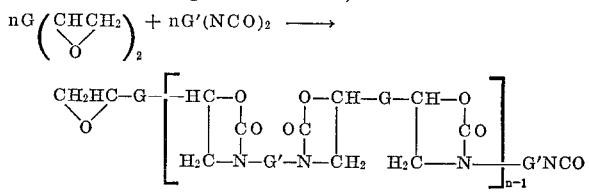

but when either the diepoxide or the diisocyanate is used in excess, as for example, at a ratio of $n:n+1$, the polymer is terminated at both ends by the reactant used in excess, the range being of the order of about 1:1 to 2:3, preferably 1:1 to 1:1.3.

Similar considerations apply to other polyfunctional reagents when they contain more than two functional groups, and, in such cases, the mole ratio is based on the number of reactive groups in each reactant.

The polymerizations can be interrupted at any intermediate fluid or viscous stage for whatever use is intended, such as for filament winding, coating, impregnation, potting, laminating, adhesive application, etc. Since the terminal groups of the polymers can undergo the reactions characteristic of such groups, they can be mixed, at an intermediate stage, with unpolymerized mono- or polyepoxides, mono- or polyisocyanates, polyols, polyamines, phenol-formaldehyde, resins, melamine-formaldehyde resins, etc., with which they can coreact further, or they can be compounded with dyes, pigments, lubricants, fillers, such as wood flour, alpha cellulose, cotton fibers, mica, silica, asbestos, alumina, aluminum, etc., for use as molding compounds and the like.

The polymers have a wide range of application and uses such as for electrical potting, encapsulant and casting, caulking, adhesive, concrete cementing agents, filament windings, paneling and flooring, molding resins and compounds, prepegs, tooling compositions, adhesives, glass, cloth and paper laminates, electronic insulation, etc.

Numerous phosphines are available commercially for conversion to the mono- and polyhydroxy onium compounds used in the practice of this invention by the reactions of equations 1, 2 illustrated hereinabove. A few, among those available from commercial sources listed in the 1970–1971 Laboratory Guide of the American Chemical Society, Aldrich Chemical Company, Inc., Catalogue Number 15, and Eastman Organic Chemicals List No. 45, are:

tris(dimethylamino)phosphine, $P(N(CH_3)_2)_3$;
diphenyl-p-tolyl phosphine, $p\text{-}CH_3C_6H_4P(C_6H_5)_2$;
bis-(1,2-diphenyl phosphino)-ethane, $$(CH_6H_5)_2PCH_2CH_2P(C_6H_5)_2$$

triallyl phosphine, $(CH_2=CHCH_2)_3P$;
trivinyl phosphine, $(CH_2=CH)_3P$;
triisopropyl phosphine, $(i\text{-}C_3H_7)_3P$;
trimethyl phosphine, $(CH_3)_3P$;
bis(2-diphenylphosphinoethyl) phenyl phosphine,
$C_6H_5P[CH_2CH_2P(C_6H_5)_2]_2$;
1-diphenylphosphino-2-diphenylarsinoethane,
$(C_6H_5)_2PCH_2CH_2As(C_6H_5)_2$;
$(C_6H_5)_2PCH_2CH_2As(C_6H_5)_2$;
tris(2-diphenylphosphinoethyl) phosphine,
$[(C_6H_5)_2PCH_2CH_2]_3P$;
cis-bis(1,2-diphenylphosphino) ethylene,
cis-$(C_6H_5)_2PCH=CHP(C_6H_5)_2$;
trans-bis(1,2-diphenylphosphino) ethylene, trans-
$(C_6H_5)_2PCH=CHP(C_6H_5)_2$;
n-butyldiphenyl phosphine, $)nC_4H_9)P(C_6H_5)_2$;
dicyclohexylphenyl phosphine, $(C_6H_{11})_2PC_6H_5$;
divinylphenyl phosphine, $(CH_2=CH)_2PC_6H_5$;
tris(2-ethylhexyl) phosphine, $(C_8H_{17})_3P$;
tris(p-methoxyphenyl) phosphine, $(p\text{-}CH_3OC_6H_4)_3P$;
tri-phenyl phosphine, $(C_6H_5)_3P$;
bis-(1,2-diphenylphosphinoethane),
$(C_6H_5)_2PCH_2CH_2P(C_6H_5)_2$;
trioctyl phosphine, $(C_8H_{17})_3P$;
methyldiphenyl phosphine, $CH_3P(C_6H_5)_2$;
methylene bis-diphenyl phosphine, $CH_2[P(C_6H_5)_2]_2$;
tributyl phosphine, $(C_4H_9)_3P$;
pentafluorophenyl-diphenyl phosphine, $C_6F_5P(C_6H_5)_2$;
etc., and phosphines having active hydrogens such as $PH_3$, monosubstituted phosphines or halides, such as $RPH_3$, $RPX_2$ and disubstituted phosphines or halides, $R_2PH$, $R_2PX$, from which other substituted phosphines or mixed phosphine-t-amine compounds are prepared, for example, by the well-known reaction with aldehyde, for example, formaldehyde, glyoxal, acrolein, etc., in the presence of a secondary amine, $R_2NH$, thus:

$$PH_3 + 3CH_2O + 3R_2NH \rightarrow P(CH_2NR_2)_3$$

$$C_6H_5PH_2 + 2CH_2O + 2R_2NH \rightarrow C_6H_5P(CH_2NR_2)_2$$

$$(C_6H_5)_2PH + CH_2O + R_2NH \rightarrow (C_6H_5)_2PCH_2NH_2$$

etc., which, in turn, are converted by quaternization to the onium halide catalysts of this invention.

An extraordinary large number of amines are available commercially for conversion to the mono- and poly-hydroxy onium compounds used in the practice of this invention by the reactions given in Equations 1 and 2, illustrated hereinabove. A few, among the many available from commercial sources, listed in the 1970–1971 Laboratory Guide of the American Chemical Society, Aldrich Chemical Catalogue Number 5, and Eastman Organic Chemicals List No. 45, are:

trimethylamine,
triethylamine,
tripropylamine,
tributylamine,
triallylamine,
tridecylamine,
triheptylamine,
trioctylamine,
tripentylamine,
triisopentylamine,
N-methyldibenzylamine,
N,N-dimethylbenzylamine,
N,N-dimethylallylamine,
N,N-diethylallylamine,
tripropargylamine,
N,N,N',N'-tetramethyl-2-butene-1,4-diamine,
N,N,N',N'-tetramethyl-2-butyne-1,4-diamine,
N,N,N',N'-tetramethyl-2-butyne-1,4-diamine,
N,N,N',N'-tetramethyldiaminomethane,
N,N,N',N'-tetramethylethylenediamine,
N,N,N',N'-tetramethyl-1,6-hexanediamine,
N,N,N',N'-tetramethyl-1,3-propanediamine,
triethanolamine,
triisopropanolamine,
N-methyl-N-propargylbenzylamine,
nitrilotriacetonitrile, $N(CH_2CN)_3$,
N,N,N',N'-tetraethylethylenediamine,
diethylaminoacetonitrile, $(C_2H_5)_2NCH_2CN$,
2-diethylaminoethanol,
2-dimethylaminoethanol,
2-dimethylaminoethyl acetate,
2-dimethylaminoethyl benzoate,
N,N-dimethylglycine ethyl ester,
3-dimethylamino-1,2-propanediol,
3-diethylamino-1-propanol,
3,3',3''-nitrilopropionamide,
pyridine,
2,2'-dipyridyl,
N,N'-dimethylpiperazine,
cyclohexyldiethanolamine,
N-ethyldibenzylamine,
N-methyldiisobutylamine,
N,N,N',N'-2-pentamethyl-1,3-propanediamine,
N,N,N',N'-tetraallylethylenediamine,
N,N,N',N'-tetraisopropylethylenediamine,
N,N,α-trimethylbenzylamine,
etc.

The following examples illustrate the practice of this invention.

Example 1

To 37.9 g. (0.25 mole) of glycidyltrimethylammonium chloride in 120 ml. of dimethoxyethylene is added 9.0 g. (0.50 mole) of water and the mixture stirred at 65–70° C. for twenty-four hours, or until the epoxy value decreases substantially or becomes zero as measured by the procedure given in Chemical Industry (London), 51, 1361T (1932) and there is obtained the water-solvalized derivative

which is isolated, by evaporation of the solvents in a rotary evaporator at 1.5 mm. pressure, as hydroscopic white crystals.

The elemental analysis of C, 42.37%; H, 9.42%; N, 8.25%; and Cl, 20.91% are in close agreement with the theoretical values for the compound.

Example 2

To a reaction vessel equipped with a stirrer, thermometer, nitrogen gas inlet tube, refrigerated condenser (−20° C.) containing 56 g. of 1-chloro-2,3-dihydroxy-propane in 100 ml. of water, there is added slowly over a period of two hours 30 g. of trimethylamine in 25 ml. of water at 25° C., following which the mixture is allowed to react with stirring for twenty-four to thirty-six hours. Concentration of the solution at 50° C. in a rotary evaporator yields Compound XI of Example 1.

Substitution of the trimethylamine in this procedure by 50.5 parts of triethylamine yields Compound IV,

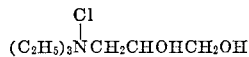

Example 3

(a) The procedure of Example 1 is repeated using 16.95 g. of

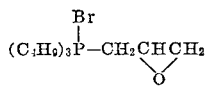

1.8 g. of water and 25 ml. of dimethoxyethane and there is obtained Compound V,

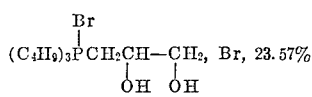

(b) The same compound is obtained by reacting 20.2 g. of $(C_4H_9)_3P$ with 15.6 g. of 1-bromo-2,3-dihydroxypropane in 150 ml. of dimethoxyethane by the procedure of Example 2.

Example 4

There is reacted according to the procedure of Example 2 the following amounts of reagents to give the compounds indicated 11.6 g. $(CH_3)_2NCH_2CH_2N(CH_3)_2$
  +12.5 g. $BrCH_2CH_2OH \rightarrow$ Compound I 39.8 g. $(C_6H_5)_2NCH_2CH_2N(C_6H_5)_2$
  +8.05 g. $ClCH_2CH_2OH \rightarrow$ Compound II 13.3 g. $C_2H_5N(CH_2CH_2OH)_2$
  +12.5 g. $BrCH_2CH_2OH \rightarrow$ Compound III 28.9 g. $P[CH_2N(C_2H_5)_2]_3$
  +50.0 g. $BrCH_2CH_2OH \rightarrow$ Compound VIII 11.6 g. $(CH_3)_2NCH_2CH_2N(CH_3)_2$
  +22.1 g. $ClCH_2CHOHCH_2OH \rightarrow$ Compound IX

Example 5

The diglycidylether of bis-phenol-A,

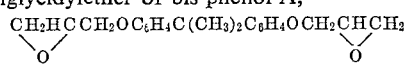

as a 10% solution in dioxane, is converted by 10% aqueous hydrochloric acid to the chlorohydrin, BPCH, $ClCH_2CHOHCH_2OC_6H_4C(CH_3)_2$
$\qquad C_6H_4OCH_2CHOHCH_2Cl$ by standing at room temperature for twenty-four hours and isolated by evaporation at 5 mm. pressure in a rotary evaporator and used as a quaternizing agent for tertiary amines and phosphine.

There is reacted by the procedure of Example 3(a) the following amounts of reagents to give the compounds indicated, 41.3 g. BPCH+20.2 g. $(C_2H_5)_3N \rightarrow$ Compound VI 41.2 g. BPCH+40.4 g. $(C_4H_9)_3P \rightarrow$ Compound VII

Example 6

Diglycidyl ether is converted to the chlorohydrin $ClCH_2CHOHCH_2OCH_2CHOHCH_2Cl$, DGCH, by reaction with hydrochloric acid by the procedure of Example 5. There is reacted 20.3 g. of DGCH by the procedure of 3.2 in two steps, with first 59 g. of $(CH_3)_3N$ and then with 20.2 g. $(C_4H_9)_3P$ and there is obtained a mixture containing substantially Compound X.

Example 7

A mixture of 11.6 g. of $(CH_3)_2NCH_2CH_2N(CH_3)_2$ and 18.5 g. of

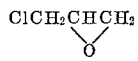

is reacted in acetonitrile or in butyl alcohol according to the procedure given in J. Organic Chem., 29, 1862 (1964) for the reaction of $(CH_3)_3N$ and

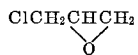

and there is obtained Compound XII

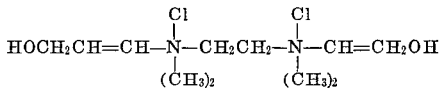

Example 8

A series of mixtures of 5.0 g. of 3,4-epoxycyclohexylmethyl-3,4-epoxycyclohexane carboxylate (Ciba CY–179) and 5.8 g. of toluene diisocyanate is prepared. One sample of the mixture is used as a control and to each of the remainder there is added various amounts of various catalysts, then the mixtures are heated at 70° C. The polymerization behavior as a function of time is summarized as follows:

| Catalyst | Weight percent | Description of polymer at time at 70° C. | | | |
|---|---|---|---|---|---|
| | | 30 minutes | 6 hours | 12 hours | 24 hours |
| None | 0 | No change | No change | No change | No change. |
| TMAC [1] | 1 | ___do___ | ___do___ | ___do___ | Slight increase in viscosity. |
| TMAC [1] | 3 | ___do___ | ___do___ | ___do___ | Do. |
| Compound I | 1 | Viscous | Soft gel | Soft polymer | Hard. |
| Compound II | 1 | Slightly viscous | Very viscous | Medium hard | Do. |
| Compound III | 1 | Soft polymer | Hard | Hard | Very hard. |
| Compound IV | 1 | Viscous | Soft gel | ___do___ | Do. |
| Compound V | 1 | ___do___ | ___do___ | ___do___ | Do. |
| Compound VI | 1 | Slightly viscous | ___do___ | ___do___ | Do. |
| Compound VII | 1 | ___do___ | ___do___ | Medium hard | Hard. |
| Compound VIII | 1 | Viscous | Gel | Hard | Very hard. |
| Compound IX | 1 | ___do___ | Hard | Very hard | Do. |
| Compound X | 1 | Slightly viscous | Gel | Medium hard | Do. |
| Compound XI | 1 | Viscous | Soft gel | Hard | Very hard. |
| Compound XII | 1 | ___do___ | ___do___ | ___do___ | Do. |

[1] TMAC is tetramethylammonium chloride.

The low molecular weight products obtained in experiments using TMAC were cloudy, containing undissolved TMAC. Similar unsatisfactory results are obtained if, instead of TMAC, the corresponding tetramethylammonium bromide, $(CH_3)_4NBr$ is used. When an amount of ethanol equal in weight to the amount of TMAC is used with the TMAC, only a soft polymer is obtained in twenty-four to thirty-six hours.

Example 9

This example illustrates polymer formation by the reaction of one mole of a bis-hydroxy-bis-onium halide with one mole of diisocyanate. There is mixed with 3.66 parts of ethylene bis-($\beta$-hydroxyethyl-dimethylammonium chloride), Compound I, and 1.74 parts of toluenediisocyanate and the mixture allowed to stand at 25° C.; the mixture becomes very viscous in twelve hours and hard in thirty-six hours. When the original mixture is heated at 100° C., it becomes hard in approximately twenty minutes.

When 5.59 parts of ethylene bis-($\beta$-hydroxyethyl-diphenylphosphonium chloride), Compound II, is substituted for the 3.01 parts of Compound I, the reaction mixture becomes a hard polymer at 100° C. in approximately eleven minutes.

Example 10

A number of polyoxazolidones are prepared using toluene diisocyanate (TDI) 98%, with various diepoxides obtained from commercial sources, the ratio of TDI to the specific diepoxide being 1:1, in which the equivalents of the diepoxides are determined by analyses. To perform the polymerization 0.01 mole of TDI, 1.78 g. of 0.01 mole of the diepoxide and approximately 0.2 weight percent on the combined TDI and diepoxide of Catalyst I are placed in glass, screw-capped vials and flushed with nitrogen and heated at 85–90° C. with agitation until all of the catalyst dissolved in the mixture, then heating is continued at 90° C. for two hours during the course of which a considerable increase in viscosity occurs. The temperature of reaction mixture is then raised at a rate of 10° C. per hour to 130° C. and solid, hard, clear castings are obtained. The amounts of reagents used with 1.78 g. of TDI are shown in the following table:

| Polyepoxide | Eq. wt. mol. epox. | Grams used | Catalyst I, mg. used |
|---|---|---|---|
| 1,4-butanedioldiglycidyl ether (Ciba RD-2) | 133 | 2.66 | 8.80 |
| Vinylcyclohexenedioxide (Bakelite ERL-4206) | 94 | 1.88 | 7.30 |
| Bis-(2,3-epoxycyclopentyl ether) (Bakelite ERL-4205) | 100 | 2.00 | 7.50 |
| Bisphenol-A-diglycidyl ether (Shell Epon 828) | 170 | 3.40 | 10.30 |
| Resorcinol diglycidyl ether (Koppers) | 115 | 2.30 | 8.10 |

At the end of the 90° C. heating period, the viscosities of the polymers are particularly suitable for use as solventless adhesives, potting and encapsulating compounds, impregnants for paper, cloth and glass fabric, chopped fabric, chopped glass fibers and the like; as well as for varnishes by dilution with such solvents as acetone, dioxane, ethyl acetate, etc. At the end of the 110° C. period, the polymers are poorly soluble in these solvent, but are soluble in aprotic polar solvents such as dimethylformamide, dimethylacetamide, dimethylsulfoxide and the like. However, at the end of the 130° C. period, the polymers are insoluble in the aprotic polar solvents.

Post-curing of the polymers is achieved by heating at 150° C. for twenty-four hours.

Example 11

The procedure of Example 7 is repeated using the phosphonium Compound II as the catalyst instead of the ammonium Compound I, and substantially identical results were obtained, except that the rate of polycondensation is slightly lower.

Example 12

In 105 parts of dimethylformamide there is dissolved 17.8 parts of Dow epoxy novolac resin DEN438 having the formula

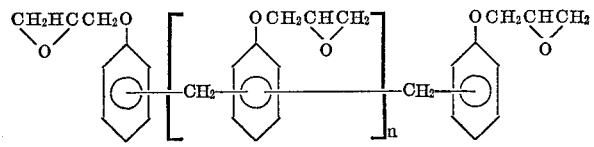

wherein $n$ has an average value of 1.6 and the epoxide equivalent weight is 178, 8.2 parts of toluene diisocyanate and 0.15 part of Compound XI, and the mixture heated at 100° C. for thirty minutes, yielding a viscous varnish particularly suited for impregnating non-woven glass mats.

A varnish having similar properties is obtained when Compounds IV V, or VIII are used as catalysts instead of Compound XI.

Example 13

In 100 parts of dimethylformamide there is dissolved 13.7 parts of commercial polymethylene-phenyleneisocyanate,

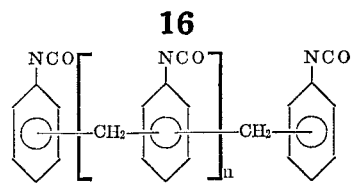

wherein $n$ has an average value of 2.1 and the isocyanate equivalent weight is 137, 17.0 parts of Shell Epon 828 and 0.25 part of Compound VI or VII and the solution processed by the procedure of Example 9, yielding a viscous varnish.

Example 14

The procedure of Example 7 is repeated using instead of TDI an equivalent weight of hexamethylenediisocyanate, 1,5-naphthalenediisocyanate, and 1,4-xylylidenediisocyanate, respectively, and in all cases, high molecular weight polyoxazolidone polymers are obtained.

Example 15

A mixture of 9.4 parts of vinylcyclohexenedioxide, 8.4 parts of toluene diisocyanate and 35 mg. of Catalyst I or 50 mg. of Catalyst VI, IX or X are heated with stirring at 90° C. under nitrogen until a very viscous but flowable polycondensation is obtained. Then a thin layer of this viscous intermediate is spread as an adhesive between (1) overlapping glass slides,
(2) two strips of aluminum,
(3) two strips of copper, and the sandwiches heated at 125° C. for ten hours. In all cases tenacious bonds are obtained.

Example 16

The reactants used in Example 12 are mixed with heated under nitrogen at 90° C. until a homogeneous mixture is obtained which is then cooled to room temperature. The slightly viscous mass is then poured over electrical components fixed in a metal container which is degassed under a reduced pressure of 5 mm. Hg pressure at 30° C. and placed in a heating chamber in which the temperature is raised at a rate of 10° C. per hour to 130° C., at which temperature it is cured for five hours. A void-free, water- and moisture-proof encapsulation is obtained.

What is claimed is:

1. A process for preparing a polyoxazolidone which comprises reacting of poly(1,2-epoxide) with an organic polyisocyanate in the presence of at least 0.005 percent by weight, based upon the combined weight of said epoxide and said isocyanate reactants, of an organic onium halide selected from the class consisting of ammonium and phosphonium halides possessing two to nine hydroxyalkyl groups.

2. The process of claim 1 in which the onium halide is selected from the class of compounds having the formula

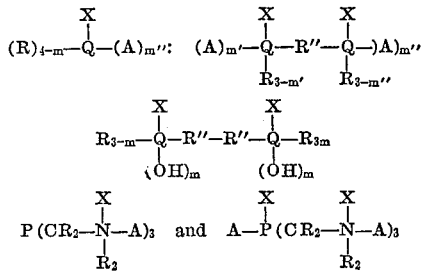

wherein

X is a halogen atom,
Q is selected from the class of N and P,
R represents a monovalent aliphatic or aromatic hydrocarbon radical containing one to ten carbon atoms,
A represents $-R'-(OH)_n$ in which R' represents an aliphatic hydrocarbon containing one to six carbon atoms, n has a numerical value of at least one and no more than three, m has a numerical value of one to four, m' has a numerical value of one to three, R" represents an aliphatic or aromatic hydrocarbon radical having one to twenty carbon atoms.

m" has a numerical value of two to four,

3. The process of claim 2 in which the onium halide is

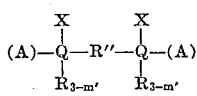

4. The process of claim 2 in which the onium halide is

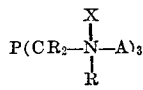

5. The process of claim 2 in which the polyisocyanate is an aryl diisocyanate.

6. The process of claim 2 in which the polyisocyanate is toluene diisocyanate.

7. The process of claim 2 in which the polyepoxide is

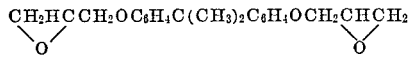

8. The product produced according to the process of claim 1.

9. The condensation product of claim 8 in which the reaction mixture comprises a polyisocyanate and a compound of the formula

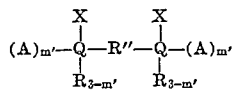

10. The product of claim 9 in which the concentration of the onium compound corresponds to at least 0.05 mole per mole of the polyisocyanate.

11. The condensation product of claim 8 in which said reactants comprise an organic polyisocyanate and a compound of the formula

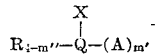

12. The product of claim 8 in which the mixture comprises a diisocyanate, a diepoxide and the onium compound contains two hydroxyl groups.

13. The product of claim 12 in which the mixture comprises a diisocyanate, a diepoxide and the onium compound contains two hydroxyl groups.

14. The process of claim 1 in which both said polyisocyanate and said poly(1,2-epoxide) are bifunctional.

15. The process of claim 14 in which the onium halide contains two hydroxyl groups.

16. The process of claim 2 in which Q is nitrogen.

17. The process of claim 2 in which Q is phosphorus.

18. The process of claim 2 in which $CR_2$ is $CH_2$.

19. The process of claim 3 in which the onium halide is

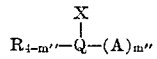

References Cited

UNITED STATES PATENTS

| | | | |
|---|---|---|---|
| 3,434,981 | 3/1969 | Baranauckas et al. | 260—606.5 |
| 3,468,816 | 9/1969 | Thompson et al. | 260—47 |
| 3,020,262 | 2/1962 | Speranza | 260—47 |

WILLIAM H. SHORT, Primary Examiner

T. E. PERTILLA, Assistant Examiner

U.S. Cl. X.R.

117—124 E, 127, 152, 161 Z B; 161—185, 186; 260—2 E P, 47 E C, 47 E N, 51 E P, 59, 775.5 R, 77.5 A B, 77.5 A P, 78.4 E P, 567.1, 606.5 F